United States Patent [19]

Vasta

[11] Patent Number: 4,495,247

[45] Date of Patent: Jan. 22, 1985

[54] PRIMER COATING COMPOSITION OF A FLUOROCARBON POLYMER AND AN AMINO ALKYL ALKOXY SILANE

[75] Inventor: Joseph A. Vasta, Wilmington, Del.

[73] Assignee: E. I. Du Pont de Nemours and Company, Wilmington, Del.

[21] Appl. No.: 509,704

[22] Filed: Jun. 30, 1983

[51] Int. Cl.³ .................. B32B 27/00; B32B 9/00; C08L 27/12; C08K 3/10

[52] U.S. Cl. .................. 428/422; 428/143; 428/149; 428/213; 428/215; 428/216; 428/325; 428/413; 428/416; 428/421; 428/447; 428/450; 428/463; 428/471; 428/472; 523/213; 524/413; 524/433; 524/520; 524/546; 525/326.2; 525/326.3; 525/342

[58] Field of Search .............. 428/413, 143, 149, 213, 428/215, 216, 325, 416, 421, 422, 324, 463, 447, 450, 471, 472; 524/546, 413, 433; 523/213; 525/342, 326.2, 326.3

[56] References Cited

U.S. PATENT DOCUMENTS

| | | | |
|---|---|---|---|
| 2,979,418 | 4/1961 | Dipner | 117/72 |
| 3,093,264 | 6/1963 | Harris | 220/63 |
| 3,343,841 | 8/1967 | Close | 427/386 |
| 3,366,612 | 1/1968 | Baldwin et al. | 260/85.3 |
| 3,470,014 | 9/1969 | Koblitz et al. | 117/72 |
| 3,526,532 | 9/1970 | Heiberger | 117/75 |
| 3,558,345 | 1/1971 | Baum et al. | 117/54 |
| 3,692,558 | 9/1972 | Werner | 117/72 |
| 3,824,115 | 7/1974 | Segawa et al. | 117/21 |
| 3,850,674 | 11/1974 | Clarke, Jr. et al. | 117/76 |
| 3,951,913 | 4/1976 | Kometani et al. | 525/326.3 |
| 3,955,036 | 5/1976 | Plueddemann | 428/429 |
| 3,988,502 | 10/1976 | Patel et al. | 526/18 |
| 4,035,565 | 7/1977 | Apotheker et al. | 526/249 |
| 4,098,756 | 7/1978 | Miller et al. | 523/458 |
| 4,141,874 | 2/1979 | Oka et al. | 524/458 |
| 4,146,532 | 3/1979 | Kometani et al. | 526/247 |
| 4,170,686 | 10/1979 | Miller et al. | 428/416 |
| 4,179,542 | 12/1979 | Christofas et al. | 428/324 |
| 4,237,177 | 12/1980 | Slama et al. | 428/215 |
| 4,243,767 | 1/1981 | Kaufman et al. | 525/342 |
| 4,250,278 | 2/1981 | Suzuki et al. | 525/341 |
| 4,284,548 | 8/1981 | Kaufman et al. | 525/102 |
| 4,298,416 | 11/1981 | Casson et al. | 156/87 |
| 4,299,869 | 11/1981 | Casson et al. | 428/35 |
| 4,307,142 | 12/1981 | Blitstein et al. | 428/143 |
| 4,323,603 | 4/1982 | Close | 524/545 |
| 4,339,553 | 7/1982 | Yoshimura et al. | 524/546 |
| 4,339,565 | 7/1982 | Tomoda | 528/27 |
| 4,347,277 | 8/1982 | Slama et al. | 428/215 |
| 4,370,436 | 1/1983 | Nakamura | 524/546 |
| 4,400,482 | 8/1983 | Close | 524/114 |

FOREIGN PATENT DOCUMENTS

53002 6/1982 European Pat. Off. .
58393 8/1982 European Pat. Off. .

OTHER PUBLICATIONS

Derwent Abst., 52946 W/32, (12/1974).
Bulletin No. 78C-15, by Abbott Laboratories, Industrial Amines, pp. 1-3.
Du Pont Sales Brochure-Viton ® Fluoroelastomers.
Abstract from Official Gazette, Aug. 23, 1983, p. 1602-U.S. Pat. No. 4,400,482.

Primary Examiner—Herbert J. Lilling
Attorney, Agent, or Firm—Hilmar L. Fricke

[57] ABSTRACT

A primer composition for fluorocarbon polymer coatings which cures at ambient temperatures and contains a fluorocarbon polymer of vinylidene fluoride and hexafluoropropylene and has a weight average molecular weight of about 50,000–300,000;

a metallic oxide such as magnesium oxide which is an acid acceptor and an amino alkyl alkoxy silane; preferably, the primer contains a reinforcing pigment such as titanium dioxide;

The primer is used in combination with fluorocarbon polymer coatings to provide corrosion and abrasion resistant coatings for equipment used in chemical plants, oil refineries, oil drilling platforms, and for the interior of smoke stacks of large utility companies.

14 Claims, No Drawings

PRIMER COATING COMPOSITION OF A FLUOROCARBON POLYMER AND AN AMINO ALKYL ALKOXY SILANE

BACKGROUND OF THE INVENTION

This invention is related to a coating composition and in particular to a fluorocarbon primer coating composition.

Fluorocarbon polymers are inert to strong acids such as sulfuric acid, nitric acid, hydrochloric acid and strong bases such as sodium hydroxide and are resistant to weathering and salt water corrosion and are tough and abrasion resistant. Coatings of these polymers can be used in chemical plants and oil refineries to coat pipes, vessels and other equipment, on off shore oil well platforms, on ships and as protective coatings for the interior of smoke stacks of utility companies. Metal smoke stack interiors are subjected to abrasion from fly ash and corrosion by acids resulting from combustion products such as $SO_x$ and $NO_x$ and halogen ions. To obtain adequate adhesion of a fluoropolymer coating to the substrate, a primer coating is required.

The composition of this invention is directed to a primer that cures at ambient temperature, has excellent adhesion to a variety of substrates and provides a surface to which a fluorocarbon polymer coating composition will adhere.

SUMMARY OF THE INVENTION

A primer composition containing about 10–50% by weight binder and 50–90% by weight of an organic solvent, wherein the binder is
a fluorocarbon polymer of vinylidene fluoride and hexafluoropropylene and has a weight average molecular weight of about 50,000–300,000;
a metallic oxide such as magnesium oxide which is an acid acceptor and
an amino alkyl alkoxy silane;
preferably, the primer contains a reinforcing pigment such as titanium dioxide.

DETAILED DESCRIPTION OF THE INVENTION

The composition contains about 10–50% by weight binder and about 50–90% by weight organic solvent. The binder is a blend of a fluorocarbon polymer, a metallic oxide which is an acid acceptor and an amino alkyl alkoxy silane. One of the advantages of the composition is that it cures at ambient temperatures and baking is not required. Therefore, the composition can be used on large structures such as the interior of smoke stacks or large chemical tanks which could not be subjected to baking temperatures using conventional techniques.

The fluorocarbon polymer is of polymerized monomers of vinylidene fluoride and hexafluoropropylene. Preferably, the polymer contains about 50–70% by weight of vinylidene fluoride and 30–50% by weight of hexafluoropropylene. The polymer can contain up to 40% by weight of other monomers such as tetrafluoroethylene. One useful polymer contains about 20–30% by weight of tetrafluoroethylene.

The fluorocarbon polymer has a weight average molecular weight of about 50,000–300,000. Preferably, fluorocarbon polymers are used that have a weight average molecular weight of about 75,000–250,000. Two particularly useful fluorocarbon polymers have a weight average molecular weight of about 75,000–125,000 and 150,000–250,000. Polymers in the lower end of the molecular weight range are preferred for forming compositions with higher binder content.

Molecular weight, as used herein, is determined by gel permeation chromatography using polymethylmethacrylate as a standard.

A metallic oxide which is an acid acceptor is used in the composition to react with the hydrofluoric acid which is generated during curing or crosslinking reaction. Typical metallic oxides are magnesium oxide, lead oxide, calcium oxide, lead hydrogen phosphite and a mixture of calcium oxide and magnesium oxide. Magnesium oxide is preferred.

The composition contains an aminoalkyl alkoxy silane. A variety of these silanes can be used but preferred are gamma-aminopropyl trimethoxy silane and gamma-aminopropyl triethoxy silane and the like.

Generally, the binder contains about 55–90% by weight, of the fluorocarbon polymer, 5–25% by weight of the above silane and 5–20% by weight of a metallic oxide which is an acid acceptor such as magnesium oxide.

Preferably, the composition contains a reinforcing agent such as titanium dioxide pigment usually in a pigment to binder weight ratio of about 20:100 to 200:100. Other inert pigments can be used such as barytes, barium sulfate, fibrous calcium silicate and the like. Carbon black, bone black or lamp black can also be used as a reinforcing pigment in a pigment to binder weight ratio of about 20:100 to 50:100.

Typical organic solvents that are used in the composition are acetone, tetrahydrofuran, methyl ethyl ketone, ethyl acetate, propyl acetate, butyl acetate, isobutyl acetate, methyl isobutyl ketone, methyl amyl acetate, diisobutyl ketone, ethylene glycol monomethyl ether acetate, ethylene glycol monoethyl ether and mixtures of the above. The solvents are used to make the composition and can be used to reduce the composition to an application viscosity.

Generally, the composition is sold in two components. The solvents, fluorocarbon polymer, pigments such as titanium dioxide and metallic oxide acid acceptor are the first component and the amino alkyl alkoxy silane is the second component which is blended by the user with the first component to form the primer composition. The primer is then reduced with one of the aforementioned solvents to an application viscosity and then applied to a substrate.

To decrease curing time and increase toughness of finishes of the composition about 0.01–3% by weight, based on the weight of the binder, of a bicyclic amidine can be added. One preferred bicyclyic amidine is 1,8-diaza-bicyclo(5,4,0)undecene-7.

The composition can be applied over a wide variety of substrates and provides a primer to which a fluorocarbon polymer coating composition can be applied. Typical substrates are untreated steel, phosphatized steel, grit blasted steel, galvanized steel, aluminum, copper, brass, cement and cementitious surfaces such as fire brick, mortar used for fire brick and the like.

Generally, the primer composition is applied to the substrate and the solvent is allowed to flash off and then a fluorocarbon polymer coating is applied and the resulting composite is cured at ambient temperatures. The primer can be cured in about 15 minutes to 48 hours or longer and can be heated to 80° C. to 120° C. for 0.5 to 2 hours for rapid curing. The thickness of the primer is about 75–250 microns depending on the end use. The thicker primer coatings provide additional corrosion resistance.

The ambient temperature curing characteristic of the composition allows for its application on large vessels and reactors, chemical plant and oil refineries, large metal structures and equipment and pipes, off shore oil well platforms, heat risers, i.e., pipes which are used in an oil well to transport the oil from underground to the surface and interior of smoke stacks used by large utility companys. Conventional compositions that do not cure at ambient temperatures but require elevated temperatures are not practical to use for the above applications.

The following examples illustrate the invention. All parts and percentages are on a weight basis unless otherwise indicated.

EXAMPLE I

Primer A was prepared as follows:

| | Parts by weight |
|---|---|
| Portion 1 | |
| Titanium dioxide pigment | 100 |
| Magnesium oxide | 15 |
| Fluorocarbon polymer solution (33% solids solution in ethyl acetate of a copolymer of 60% vinyldene fluoride and 40% hexafluoropropylene having a weight average molecular weight of about 100,000) | 303 |
| Portion 2 | |
| gamma-aminopropyltrimethoxy silane | 18. |
| Total | 436 |

The constituents of portion 1 were charged into a mixing vessel and thoroughly blended and then portion 2 was added and blended. The resulting composition was reduced to a spray viscosity with methyl ethyl ketone and sprayed onto untreated steel panels and solvent was allowed to flash from the primer at ambient temperatures. The resulting primer coat has a thickness of about 125 microns.

A fluorocarbon polymer coating composition was prepared using the same above constituents in the same amounts as for the primer except portion 2 was replaced with 5.5 parts by weight of a 55% solids solution in isopropanol of an amine curing agent which is the reaction product of 3 moles isophorone diamine and 1 mole of dimethylmaleate. The coating composition was reduced to a spray viscosity with methyl ethyl ketone and sprayed onto the above prepared primed panels. In each case, thick films were applied by allowing flash drying between each application and the coatings were dried at ambient temperatures and gave a 200 micron thick dry coating. On each panel, the coating had excellent adhesion to the primer and could not be separated from the primer. After 7 days of curing, each coating was fully cured and was resistant to sulfuric acid, sodium hydroxide and solvents such as methyl ethyl ketone and ethyl acetate.

The above primer A was reduced to a spray viscosity with methyl ethyl ketone and sprayed onto untreated steel panels and aluminum panels and dried and cured at ambient temperatures for 7 days. The resulting dry films were about 125 microns thick and had excellent adhesion to the metal substrates and were white and smooth in appearance.

Primer B was prepared using identical constituents in the same amounts as in the above primer A except magnesium oxide was omitted. The primer was reduced to a spray viscosity with methyl ethyl ketone and sprayed onto steel panels and aluminum panels and dried and cured for 7 days at ambient temperatures. The resulting film on each of the panels was about 125 microns thick. The films were relatively soft in comparison to Primer A and were not resistant to methyl ethyl ketone which indicated a lack of cure.

Primer C was prepared using identical constituents in the same amounts as used in the above primer A except the titanium dioxide and magnesium oxide were omitted. The primer was reduced to a spray viscosity with methyl ethyl ketone and sprayed onto steel and aluminum panels and dried and cured for 7 days at ambient temperatures. The resulting film on each of the panels was about 125 mils thick. The films were relatively soft in comparison to Primer A and were not resistant to methyl ethyl ketone indicating a lack of cure.

EXAMPLE 2

Primer D was prepared using the same constituents and amounts as in Example 1 except gamma-amino propyltriethoxy silane was substituted in the same amount for the gamma-aminopropyltrimethoxyl silane. The primer was reduced to a spray viscosity as in Example 1 and sprayed onto aluminum and steel panels and flash dried as in Example 1 to provide a primer coating about 125 microns thick.

The fluorocarbon polymer coating composition of Example 1 was applied to each of the above primed metal substrates and dried and cured at ambient temperatures and gave a 200 micron thick dry coating. In each case, the coating had excellent adhesion to the primed metal substrate and was resistant to sulfuric acid, sodium hydroxide and solvents such as methyl ethyl ketone and ethyl acetate.

EXAMPLE 3

To each of the above prepared Primers A and D about 0.17% by weight, based on the weight of the fluorocarbon polymer binder, of an additive of 1,8-diaza-bicyclo(5,4,0)undecene-7 was added. Each of the primers were reduced to a spray viscosity as in Example 1 and sprayed onto aluminum and steel panels and dried at ambient temperatures. Each of the primer coatings cured in several minutes to a solvent resistant coating which was more rapid than the curing of the primers without the additive. Also, a harder finish was formed. The primer is expected to be useful in automotive and truck applications where finishes are exposed to greases and synthetic fluids and lubricants.

I claim:
1. A composition consisting essentially of about 10–50% by weight binder and 50–90% by weight organic solvent, wherein the binder consists essentially of
   a fluorocarbon polymer comprising vinylidene fluoride and hexafluorpropylene having a weight average molecular weight of about 50,000–300,000;
   a metallic oxide which is an acid acceptor and
   an amino alkyl alkoxy silane selected from the group consisting of gamma amino propyl trimethoxy silane and gamma amino propyl triethoxy silane.

2. The composition of claim 1 in which the fluorocarbon polymer has a weight average molecular weight of about 75,000–250,000.

3. The composition of claim 2 in which the fluorocarbon polymer consists essentially of about 50–70% by weight of vinylidene fluoride and 30–50% by weight of hexafluoropropylene.

4. The coating composition of claim 3 in which the metallic oxide is magnesium oxide.

5. The coating composition of claim 4 in which the silane is gamma-aminopropyl trimethoxy silane.

6. The coating composition of claim 4 in which the silane is gamma-aminopropyl triethoxy silane.

7. The coating composition of claim 4 containing a filler pigment of titanium dioxide.

8. The composition of claim 4 containing about 0.01–3 percent by weight, based on the weight of the binder, of a bicyclic amidine.

9. The coating composition of claim 8 in which the bicyclic amidine is 1,8-diaza-bicyclo(5,4,0)-undecene-7.

10. The composition of claim 1 in which the binder consists essentially of
    (A) 55–90% by weight of a fluorocarbon polymer consisting essentially of polymerized units of 50–70% by weight, based on the weight of the weight of the polymer, of vinylidene fluoride and 30–50% by weight, based on the weight of the polymer, of hexafluoropropylene and has a weight average molecular weight of about 75,000–250,000;
    (D) 5–25% by weight, based on the weight of the binder, of a silane selected from the group consisting of gamma-amino propyl trimethoxy silane and gamma-amino propyl triethoxy silane;
    (C) 5–20% by weight, based on the weight of the binder, of magnesium oxide.

11. The coating composition of claim 9 containing titanium dioxide pigment in a pigment to binder weight ratio of about 25:100–200:100.

12. A two component composition, wherein the two components are mixed together to form a composition consisting essentially of about 10–50% by weight binder and 50–90% by weight organic solvent and wherein the components consisting essentially of
    component (1) a solution of a fluorocarbon polymer consisting essentially of vinylidene fluoride and hexafluoropropylene having a weight average molecular weight of about 50,000–300,000 and a metallic oxide which is an acid acceptor; and
    component (2) an amino alkyl alkoxy silane selected from the group consisting of gamma-amino propyl trimethoxy silane and gamma-amino propyl triethoxy silane.

13. A substrate coated with a layer of the composition of claim 1.

14. A metal substrate coated with a first layer of the cured composition of claim 1 and a second layer in firm adherence to the first layer of a fluorocarbon polymer coating.

* * * * *